C. E. FIELD.
APPARATUS FOR SEPARATING HEDDLES OR THE LIKE.
APPLICATION FILED MAR. 7, 1918.

1,399,854.

Patented Dec. 13, 1921.
6 SHEETS—SHEET 1.

Inventor:
Chester E. Field.
by Emery, Booth, Janney & Varney
Attys.

C. E. FIELD.
APPARATUS FOR SEPARATING HEDDLES OR THE LIKE.
APPLICATION FILED MAR. 7, 1918.

1,399,854. Patented Dec. 13, 1921.
6 SHEETS—SHEET 2.

Fig. 14.

C. E. FIELD.
APPARATUS FOR SEPARATING HEDDLES OR THE LIKE.
APPLICATION FILED MAR. 7, 1918.

1,399,854.

Patented Dec. 13, 1921.
6 SHEETS—SHEET 6.

Inventor:
Chester E. Field.
by Emery, Booth, Janney & Varney
Attys.

UNITED STATES PATENT OFFICE.

CHESTER E. FIELD, OF BOSTON, MASSACHUSETTS, ASSIGNOR, BY MESNE ASSIGNMENTS, TO BARBER-COLMAN COMPANY, OF ROCKFORD, ILLINOIS, A CORPORATION OF ILLINOIS.

APPARATUS FOR SEPARATING HEDDLES OR THE LIKE.

1,399,854.

Specification of Letters Patent. Patented Dec. 13, 1921.

Application filed March 7, 1918. Serial No. 220,909.

*To all whom it may concern:*

Be it known that I, CHESTER E. FIELD, a citizen of the United States, and a resident of Boston, in the county of Suffolk and State of Massachusetts, have invented an Improvement in Apparatus for Separating Heddles or the like, of which the following description, in connection with the accompanying drawings, is a specification, like characters on the drawings representing like parts.

This invention relates to textile machines, and more particularly to apparatus for separating the leased heddles of a cotton harness or the warp threads of a leased warp or other similar elements preparatory to performing some operation thereon, as, for example, the operation of warp drawing.

This application is a continuation in part of my prior copending application Serial No. 361,689, filed March 11, 1907 (renewed June 26, 1917, Serial No. 177,152).

For illustrative purposes, the invention is herein shown as embodied in an apparatus for separating and positioning the harness eyes of an ordinary cotton harness preparatory to drawing warp threads therethrough, but the same is not limited to this particular use or to this particular embodiment, but may, for example, be usefully employed in separating elements other than heddles and in connection with warp replenishing or other warp treating operations other than that of drawing-in.

The mechanical separation and positioning of the eyes of a cotton harness for the warp drawing operation as at present practised, requires the use of spacers in the form of springs which are applied to the heddles as a permanent attachment to the harness. The separating mechanism is caused to act on these spacers directly, and thereby indirectly on the heddles. Through the present invention it is practicable to do away with such spacer springs and perform the necessary functions of separating and positioning the eyes directly by the use of extremely simple devices.

While my invention is applicable to all kinds of harnesses, it will be more readily apprehended by reference to the ordinary cotton harness, in which there are opposite series of eyes.

Referring therefore, for the purpose of clear illustration to this kind of harness and remembering that at least two harnesses are present in a loom, I provide coöperating members, one for each harness, so arranged and connected that one member holds open one harness while the other member is holding an eye in position to be threaded and then the operation is reversed and the threaded heddle is shoved out of the way and that harness held open so as not to interfere with the drawing of a thread through an eye of the opposite harness, the first mentioned member meanwhile holding the eye of the latter harness for threading. In case there are a large number of harnesses, the members coöperate in such manner that all of the harnesses are held open excepting the one being threaded, the latter being held in position to be threaded, and when said operation has been performed then said harness is itself held open along with all the rest of the harnesses excepting the next one in order to be threaded, which instead of being held open is held in position to be threaded.

In its details, the illustrative form of my invention embodies an operating member which first selects the proper eye from among those which are not threaded, moves it into position for threading and holds it there while being threaded, and then separates it or moves it forward to the threaded end of the harness while still holding back therefrom all the unthreaded eyes so as to make a gap or open space through the harness to the next harness to permit the entrance of the warp drawing needle or mechanism to the latter harness.

The constructional details of my invention will be pointed out more at length and the invention further explained and amplified in connection with the accompanying drawings, in which I have shown a preferred embodiment out of many contemplated embodiments of my invention, and the latter will be further defined in the appended claims.

In order to make my invention fully understood I have presented it in connection with a so-called cotton harness, which consists of two parallel shafts $a$ and $b$ and a series of heddles extending between the shafts. Each heddle has an eye $c$. The heddles are so constructed and arranged that the eyes lie in two parallel planes, successive eyes being in different planes. The lower end of each eye is connected to two cords $d$ which extend to that side of the shaft $b$ at which the eye lies. The upper end of the eye is attached to two cords $e$ and $f$ which extend to opposite sides of the shaft $a$, the cords $f$ of the various heddles crossing one another.

Viewing more particularly Figs. 1, 2, 3 and 10, it will be seen that I mount on suitable standards 1 a base 2 supporting the operative parts of my invention, and an overhead carrier or support 3 provided with suspending means herein shown as hooks 4 adjustable at 5 for supporting the harnesses. In a sliding frame 8 on a shaft 9 are fixed to rotate cams herein shown as two in number, 10, 11, as I am illustrating my invention in connection with two harnesses, said shaft being rotated by a sprocket chain 12 driven by a sprocket 13 mounted in hangers 14 depending from the frame and keyed to slide on a shaft 15 driven by a belt pulley 16 or other suitable power. The sliding motion is communicated to the frame or carriage 8 by a screw 17 operated by gears 18, 19, 20, see Fig. 10, from the shaft 15. Co-operating with the cams 10, 11 are segmental racks 21, 22 pivoted at 23 so as to swing in operative engagement with pinions 24, 25 fast respectively on rock shafts 26, 27, which constitute part of the operating members, as I have termed them, for operating on the harness cords. Said shafts 26, 27 are journaled adjacent their forward ends in supports 29 mounted in tracks 30 provided in guide bars 31, one for each harness. The guide bars 31 extend between the cords $d$ of the two series of eyes $c$, and thus assist to hold the two series of eyes spaced apart. At its front end each operating member has a head 32.

Figures 2, 3:
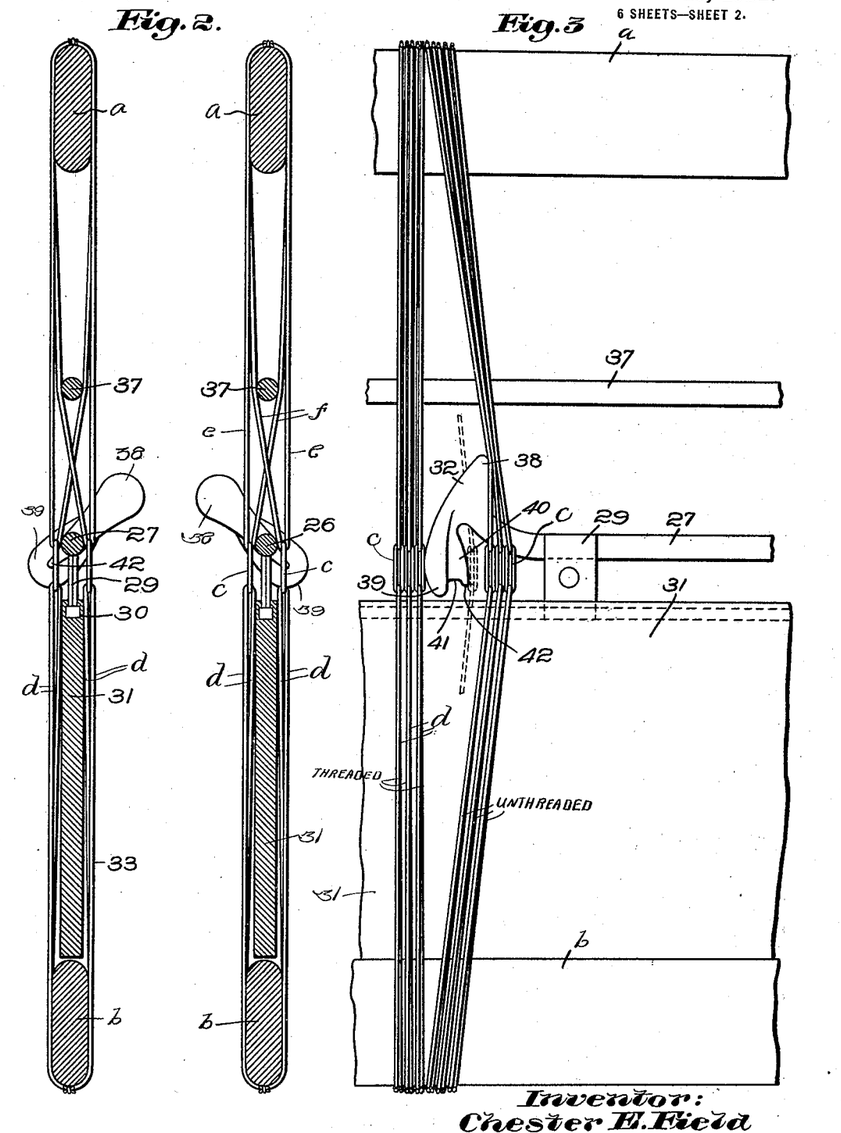
Fig. 2 is a vertical cross-sectional view of two harnesses showing the relative position of my operating members.
Fig. 3 is an enlarged broken detail in side elevation of an operating member and the adjacent portions of a harness.
Figure 4:
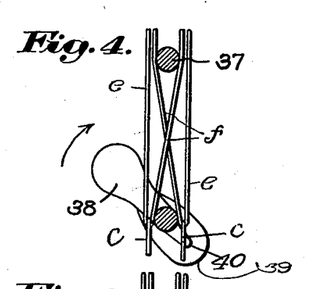
Figs. 4 and 5 show respectively in cross-section and side elevation what may be termed the first position of an operating member with relation to a usual cotton harness.
Figure 5:
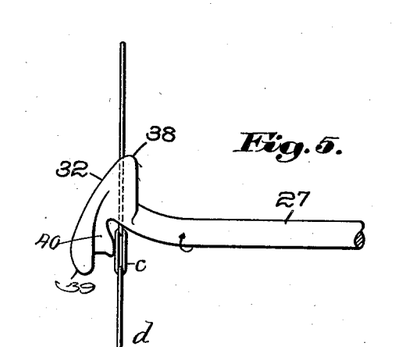
Figure 6:
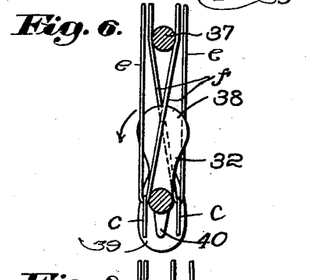
Figs. 6 and 7 are similar views showing the next position of the parts.
Figure 7:
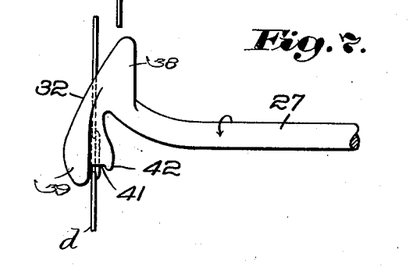
Figure 8:
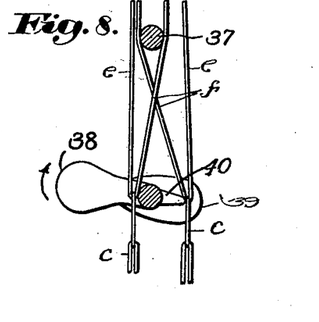
Figs. 8 and 9 are similar views showing the third position of the parts, the fourth position being shown in Fig. 2.
Figure 9:
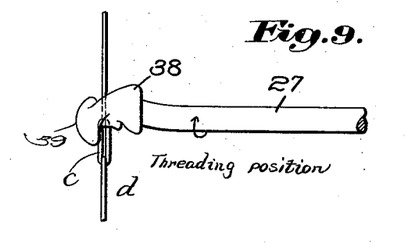
Figure 10:
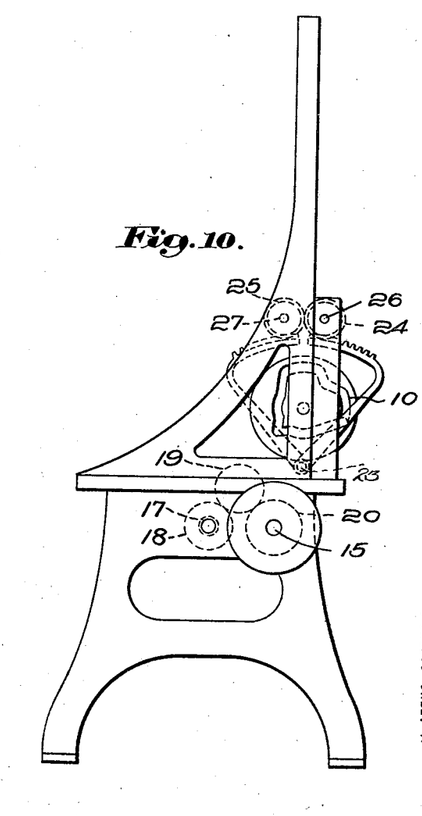
Fig. 10 is an end elevation of the parts shown in Fig. 1.

Above the points where the cords $f$ cross one another I insert a lease rod 37 or other suitable means to restrain the cords $f$ sufficiently so that they may be operated upon with certainty by the fan-shaped heel 38 of the member 32. In Figs. 2 to 9 I have shown the successive movements, and it will render my invention more readily understood to explain said movements at this point: starting with the position shown in Figs. 4 and 5, the operating member 32 (which is pulled back as shown in Fig. 3 so as to maintain the unthreaded heddles under more or less tension or tendency to move forward) rocks over to the right in the direction indicated by the arrow, Fig. 4, to the position shown in Fig. 6, the wedge-shaped heel 38 of the member 32 entering between the cords $f$. The cords $e$ and $f$ of the right-hand eye assume some such position as that indicated in Fig. 7, said cords being prevented from springing entirely forward beyond the head 32 by the engagement of the eye against the rear side of the holding shoulder 39. Thereupon the head 32 rocks over to the left in the direction of the arrow Fig. 6, to the position shown in Fig. 8, so that the eye is caught or engaged by the positioning holder 40, which for this purpose has preferably a flat front edge 41 and a retaining prong or finger 42 opposite the holding shoulder 39. This faces and holds the eye firmly and steadily in exactly the position required for threading by a warp needle or other usual or preferred warp drawing device. The weight of the harness mechanism holds the cords all reasonably taut while the separating position of the operating member or head 32 slightly strains the heddle whose eye is to be threaded so that said eye is obliged to remain exactly as required. As soon as the eye has been threaded the head 32 rocks over to the right in the direction of the arrow, Fig. 8, to the extreme position shown at the left portion of Fig. 2, thereby permitting the wedge-shaped edge of the fan-like heel 38 to engage behind the cords e and f of the eye just threaded while the extreme rocking movement permits at the same time the holding shoulder 39 to swing under to the left entirely free from said cords e and f, and the extreme slant or wedge-shape of the front surface of the head, as shown clearly in Fig. 3, operating to shift or shove forward the cords e and f and the eye which has just been threaded, said eye thereupon taking its place with the other threaded eyes. This much having been accomplished, it will be observed that the head is now in what may be called the starting position again for selecting another heddle and moving its eye into position to be threaded, the only difference being that it tips in just the opposite position from that shown in Fig. 4, so that instead of operating upon a right-hand eye this time it will operate upon a left-hand eye. The series of movements, however, is exactly the same with reference to the left hand eye that it was with reference to the right hand eye, excepting that each swinging movement of the head is in the opposite direction and the cords e and f of the left-hand eye are first permitted to spring by the heel 38 on the left-hand side thereof, Fig. 6, and is held by the left-hand side or edge of the holding shoulder 39 and the positioner 40 holds the eye out tight to the left, said part 40 pointing in directly the opposite direction to that shown in Fig. 8. All this movement is accomplished by the cam 11 which is shown in position with relation to the rack arm 22 and pinion 25 to produce the series of movements just explained beginning with the reference to Fig. 4, said cam moving in the direction of the arrow, Fig. 4.

Figures 11, 12, 13:
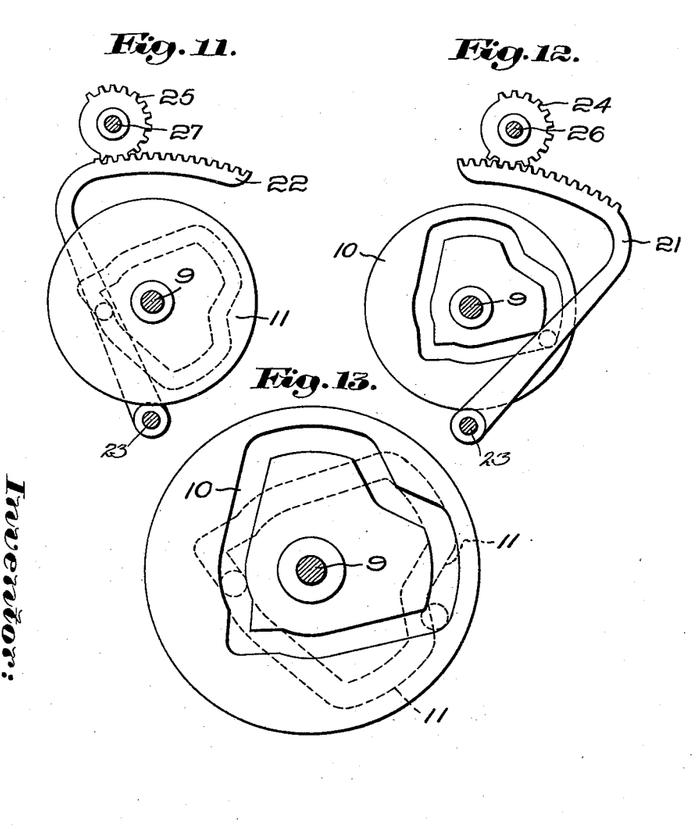
Figs. 11 and 12 are cross-sectional views showing particularly the cams for causing the movements just mentioned of the operating members.
Fig. 13 is a view partly diagrammatic, showing the relative positions of the cams.
Figure 14:
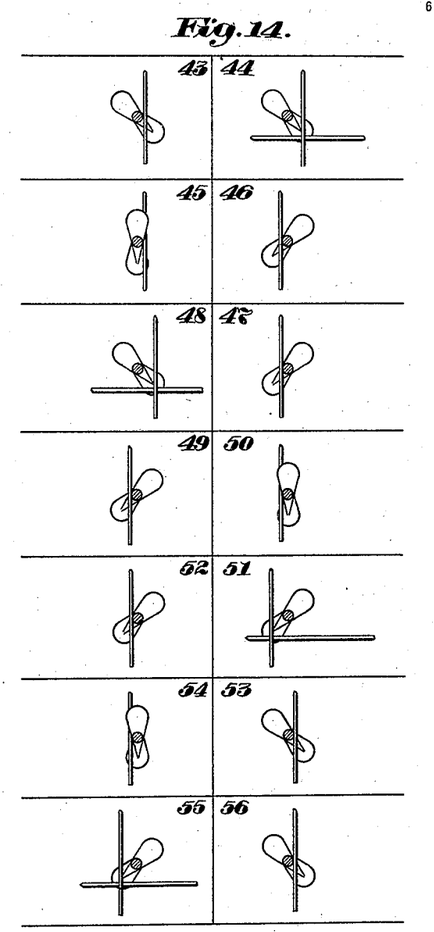
Fig. 14 is a diagrammatic view showing the relative position of two operating members throughout the cycle of operation.

As it is necessary to thread all the harnesses of the loom at the same time, and as a loom necessarily has two or more harnesses, the harness cords of that harness or those harnesses which are not being threaded must be held out of the way of the drawing needle while a thread is being drawn through an eye of the remaining harness. To insure this operation I so position the respective operating members or heads 32 and their actuating cams that one head is dwelled in the position shown in Fig. 3, holding back or separating the cords of one harness so as to make a gap or open space through which the warp drawing needle may enter to thread the eye of the adjacent harness which is being held by its operating member in the position shown in Fig. 8. For two harnesses the cams are preferably positioned as shown in Figs. 11, 12 and 13, the former showing the cams separately for clearness of illustration. The result is that the movements of the respective operating members with relation to each other, for two harnesses is as shown in Fig. 14, where it will be seen that as one head occupies the position of dwell shown at 43 or in spacing position, the opposite head is in the position shown at 44 or in eye-holding position, and as the left-hand head moves thence into the upright position 45 (as shown also in Fig. 6), the right-hand head moves into the opposite position or spacing position 46 and maintains the same position as indicated at 47 while the left-hand head moves into the holding position 48. As soon as its eye has been threaded it moves over into spacing position 49 and at the same time the right-hand head moves into vertical position 50 for selecting its next heddle and then turns down into holding position 51, the left-hand head still retaining its spacing position as indicated at 52 and so remaining until the thread has been drawn in the opposite eye held at 51. Thereupon the head which has been holding its eye at 51 rocks to the opposite spacing position 53 while the left-hand head selects its heddle at 54 and then deflects it into eye-holding position 55 while the right-hand head still retains at 56 the same separating position as 53. These movements continue in regular and rapid order so that as fast as the threading needle can reciprocate it finds the next proper eye ready to be threaded. An eye is selected first from one harness and then from the other harness. In any given harness the eyes are selected successively, an eye being selected first from one series and then from the other series.

It will be seen that when the head moves from its eye-holding or eye-threading position back over the line of heddle crossings to its dwelled spacing position, the heel 38 acts to release the foremost one of the unthreaded heddles. The advance of the latter, however, is stopped by the relatively advanced, oppositely extending, intermediate holding shoulder formed by the side of the projection 40 which retains the released heddle in the position indicated in Fig. 5, where it lies at one side of the line of travel of the drawing-in needle when the latter acts to thread the eye of the companion harness. As soon as the threading of the companion harness takes place, the head moves back to its upright position (Fig. 6) forcing the released heddle past the intermediate holding shoulder and against the main holding shoulder 39 and into the position indicated in Fig. 7. This movement of the head, however, is not sufficient to release any of the remaining heddles. The head then immediately reverses its movement, swinging to the threading position indicated in Fig. 8, where the released heddle eye is faced in the needle path. As soon as the eye is threaded, the head again moves back past the line of heddle crossings to its other position of dwell, this movement serving to pass on the threaded heddle and release the next unthreaded heddle against the intermediate holding shoulder.

The movement performed by the head, therefore, is a compound, oscillatory movement, first from one threading or facing position across the line of heddles to its spacing position, thence (after an interval) back to an upright position, and thence immediately back to its other threading or facing position, and so on.

Figure 1:
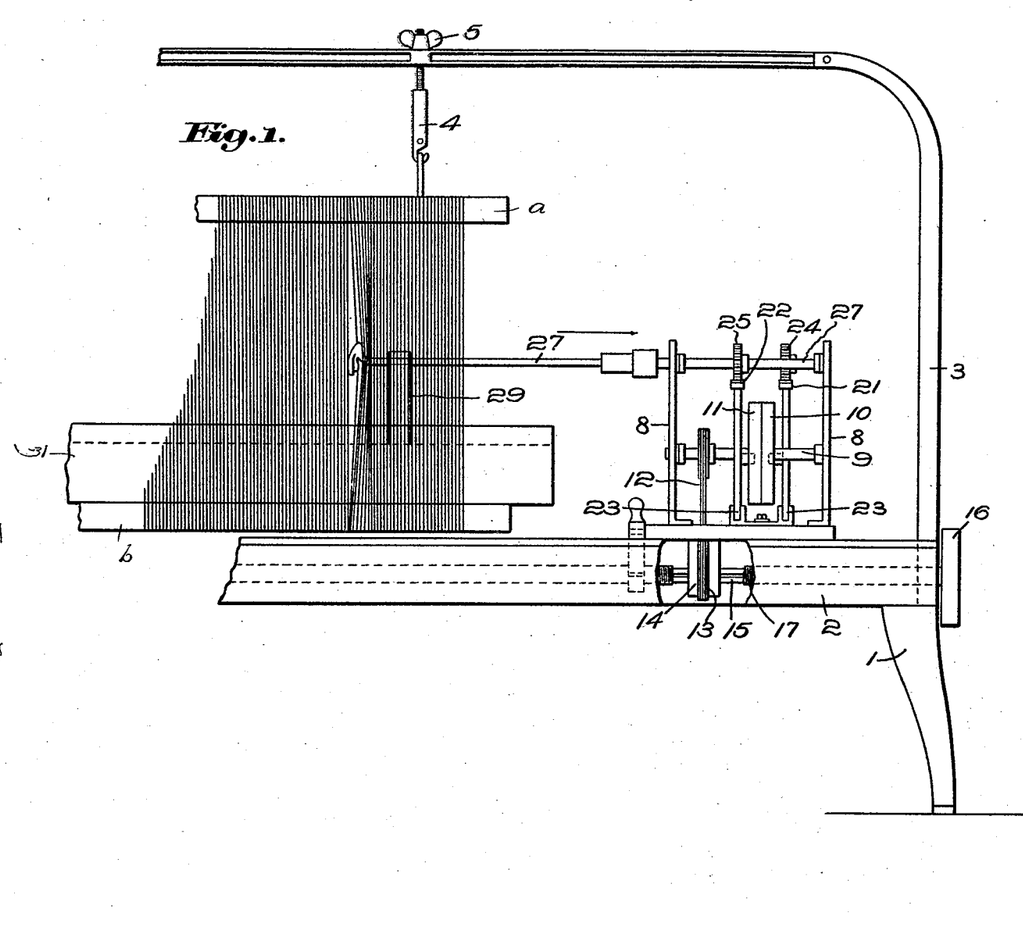
Figure 1 is a broken side elevation of a sufficient portion of my apparatus to enable the invention to be clearly understood; no attempt having been made to illustrate the heddles in detail.

Meanwhile the frame or carriage 8 has been moved backward by the screw shaft 17, thereby maintaining it continuously in proper position to keep the non-threaded heddles retracted under proper tension, as shown clearly at the right Figs. 1 and 3, so as to coöperate with the rocking movement of the operating member to move automatically forward step by step in the sequence of movements already described. Although I have shown the cams arranged to throw the heads in one direction, it will be understood, so far as the operativeness of my mechanism is concerned, that either may be arranged to throw its head in the opposite direction, it being essential merely that the heads of all the harnesses which are not being threaded at a given movement shall be rocked to spacing position and only the head of the harness to be threaded at that movement, rocked to eye-holding position, whereupon said last-mentioned head is moved to spacing position while the head of the next harness to be threaded is moved to eye-holding position, and so on.

I have purposely shown my invention in its simplest embodiment in order that it may be more readily and clearly apprehended, and it will be understood that when a loom contains more than two harnesses, the operative parts must be correspondingly modified.

Figure 15:
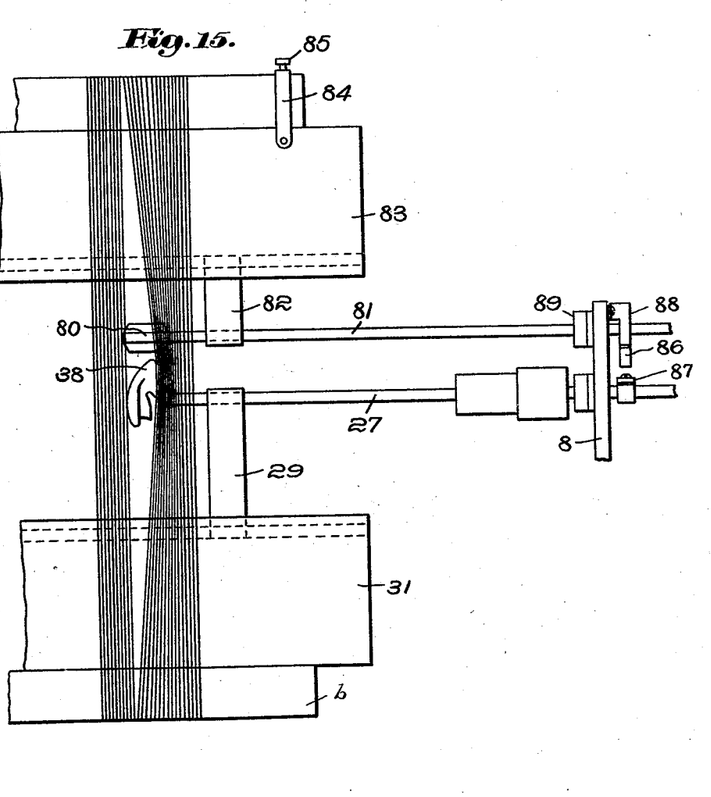
Fig. 15 shows a modified form of the apparatus wherein there is employed a tensioning device for the heddle cords.
Figure 16:
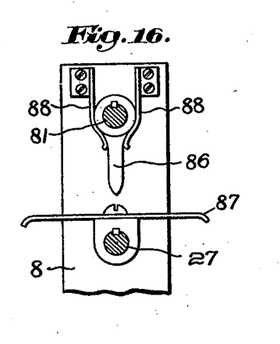
Fig. 16 is a detail, on an enlarged scale, showing the actuating mechanism for the tensioning device.
Figure 17:
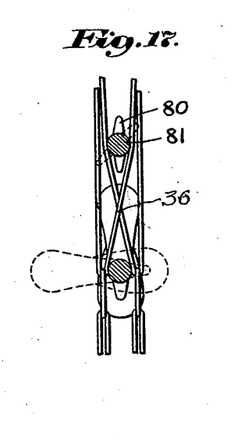
Fig. 17 is an end elevation in detail showing the relation of the tensioning device to the heddle cords.

In Figs. 15 to 17, inclusive, I have shown a modified form of the invention, wherein there is employed, in place of the lease rod 37, an auxiliary tensioning device 80 which is adapted to tension the heddle cords which are being acted upon by the selector and take up any slack which may exist in the cords and thereby increase the effectiveness of the selector in handling the heddles. Such tensioning effect may be obtained in various ways, but herein a tensioning member 80 comprises a pair of radially extending wings secured to the end of the oscillatory shaft 81, the latter having a bearing in the sliding support 82 mounted to slide with the carriage in a groove in the guide bar 83 similar to the guide bar 31, in which is mounted the sliding bearing 29 for the shaft 27. The guide bar 83 may be held in position by any suitable means. For this purpose there is herein provided a bracket 84 at each end (one only being shown) by which the guide plate may be secured to the upper harness bar by suitable means, as by the set screw 85. The opposite end of the shaft 81 has a bearing in the frame member 8 and carries the depending finger 86 which projects down between the two lateral arms 87 secured to the shaft 27. The centering springs 88 may be employed to engage the depending arm so that the tensioning member is normally held in a central or tensionless position.

When the shaft 27 is oscillated, however, in either direction, the finger 86 is engaged by one of the arms 87 and the shaft 81 also oscillated, throwing the winged tensioning member 80 at an angle, so that it engages the neighboring heddle cords and tends to stretch the same more tightly over the reciprocatory selector head 32. Preferably a small amount of lost motion is provided between the arms 87 and the finger 86, so that the tensioning member does not move until the head has moved somewhat past its central position. Preferably, also, the tension applied to the cords is yieldable, as, for example, by making the arms 87, to some extent, resilient, so that where a heddle cord is encountered which is tighter than its neighbors, the tensioning device would be permitted to yield somewhat. This will apply the tension variable, according to the varying requirements of the heddles.

While the tensioning may be applied merely to the released heddle, preferably the tensioning wings are of sufficient extent to tension all the heddles which are under the influence of the selecting member.

The action of the tensioning device is indicated in Fig. 17. As the selector executes its compound, oscillatory movement, the tensioning member will also swing back and forth applying an increasing tension to the adjacent heddles.

The shaft 81, like the shaft 27, may have any suitable clutch connection, such as is conventionally represented at 89, whereby it may be separated at that point for convenience in installing the work in the machine.

While I have herein shown for purposes of illustration one specific embodiment of the invention, it is to be understood that the same is not limited either to the mechanical details or the form or relative arrangement of parts, or the specific application herein made thereof, but that extension deviations may be made therefrom without departing from the spirit of the invention.

Claims—

1. In an apparatus of the kind described, means to pull back the harness cords which are to be threaded, and means to pick off the cords one by one alternately from opposite sides of said held-back harness, said pick-off means having a part for holding the eyes of said successive cords in position to receive the warp.

2. In an apparatus of the kind described, means to hold back the harness cords which are to be threaded, means to pick off the cords one by one, alternately from opposite sides of the harness, and means for holding the eyes of said successive cords in position to receive the warp, said pick-off means carrying as a part thereof a device for moving the threaded harness cords forward away from the non-threaded cords and having a construction adapted to retain at the same time said non-threaded cords in held-back position.

3. In an apparatus of the kind described, means adapted to engage and to move the lease of a harness close to the harness eyes, and a unitary device operating adjacent said lease-moving means to effect an initial separation of individual cords as they are to be threaded, and move them successively to a threading position by a single continuing engagement with each cord, said device having a part thereof constructed and arranged to hold back simultaneously all the remaining non-threaded cords during said threading operation.

4. In an apparatus of the kind described, a device arranged to engage the rear or inner sides of the harness cords and hold them individually outward, said device having a unitary part thereof constructed to also hold the cords laterally away from the plane of the harness.

5. In an apparatus of the kind described, a device arranged to engage the rear or inner sides of the harness cords and hold them individually outward in a direction away from said inner side and the plane of the harness, said device having, as a part thereof, means for also selecting cords successively one by one.

6. In an apparatus of the kind described, a device arranged to engage the rear or inner sides of the harness cords alternately at opposite sides of the harness, said device having, as a part thereof, means to hold the cords individually outward and taut in a direction transverse to the plane of the harness.

7. A harness cord selector mounted to operate in the lease of the harness, and mechanism for operating said selector to select successive individual cords, said selector having separate formations for positioning and holding the selected cord in position to be threaded.

8. An apparatus of the kind described having a harness cord selecting mechanism extending longitudinally of the harness between the opposite cords thereof, said selecting mechanism consisting in a unitary cord engaging device, means to move said device to act on successive cords at the opposite sides of the harness alternately, said operating mechanism having feeding means for moving said selecting mechanism in the direction of the progressive threading of the eyes and at a rate adapted to keep the non-threaded cords under tension.

9. An apparatus of the kind described, having a harness cord selecting device extending longitudinally of said harness between the opposite cords thereof, said selecting device including means for making a transverse gap through the harness and having provision for holding a selected cord apart and at one side of the plane of the harness in the midst of said gap in position to be threaded.

10. An apparatus of the kind described, adapted to operate on a plurality of harnesses of a loom shed, comprising mechanism for selecting harness cords from each harness successively for threading, said mechanism having a device coöperating with each harness for moving the cords thereof, said device being arranged to hold a cord of each harness in position for threading one after another and having a part adapted to hold the cord to be threaded in position for threading, and another part adapted to hold back the succeeding cords.

11. An apparatus of the kind described, adapted to operate on a plurality of harnesses of a loom shed, comprising a unitary device for selecting and holding harness cords in taut position to be threaded, and operating means for actuating said device to select successive cords successively in the different harnesses and in the respective harnesses alternately from opposite sides thereof, said operating means including feeding mechanism for positively feeding forward said selecting device in one direction only.

12. An apparatus of the kind described, adapted to operate on the opposite harnesses of a loom shed, comprising a unitary device for selecting harness cords to be threaded, including means for forming alined transverse gaps in the two harnesses, and operating means for actuating said unitary device to select and hold an individual cord in the midst of one of said gaps in position to be threaded.

13. An apparatus of the kind described, adapted to operate on the opposite harnesses of a loom shed, comprising a unitary device for selecting harness cords to be threaded, including means for forming alined transverse gaps in the two harnesses, and operating means for actuating said unitary device to select and hold an individual cord in the midst of one of said gaps in position to be threaded, said selecting device including means operating to hold a cord in the position stated alternately from the opposite harnesses.

14. An apparatus of the kind described, adapted to operate on the opposite harnesses of a loom shed, comprising a unitary device for selecting harness cords to be threaded, including means for forming alined transverse gaps in the two harnesses, and operating means for actuating said unitary device to select and hold an individual cord in the midst of one of said gaps in position to be threaded, said selecting device including means operating to hold a cord in the position stated alternately from the opposite harnesses and in each harness alternately from opposite sides thereof.

15. An apparatus of the kind described, adapted to operate on a plurality of harnesses, comprising rods mounted for rotation and extending longitudinally within the respective harnesses, each provided with an operating head for engaging the cords of the loom harness first at one side and then at the other side of the harness, separate devices for operating the respective rods, a carriage for said devices and rods, and a feeding device for moving said carriage and said mechanism for operating on the harnesses backward as the harnesses are threaded.

16. An apparatus of the kind described, adapted to operate on a plurality of harnesses, comprising rods mounted for rotation each extending within and longitudinally of a harness and provided with an operating head for respectively engaging the cords of such harness first at one side and then at the other side of the head, a cam for governing the movement of each rod, a carriage for all of said cams and rods, and a feed screw for moving said carriage and the harness operating mechanism carried thereby backward as the harnesses are threaded, said mechanism being arranged to rotate said rods successively in operative relation to the respective harness eyes to be threaded.

17. In an apparatus of the kind described, a rotary rod extending lengthwise of and within the harness provided at its forward end with an operating head to engage the harness cords, mechanism at the rear end of said rod for rotating it, and a sliding support adjacent the front end of said rod for maintaining said head in proper position with relation to the harness.

18. In an apparatus of the kind described, a rotary rod provided at its forward end with an operating head to engage the harness cords, mechanism at the rear end of said rod for rotating it, and a support located inside of the harness for maintaining said head in proper position with relation to the harness.

19. In an apparatus of the kind described, a rotary rod provided at its forward end with an operating head to engage the harness cords, mechanism at the rear end of said rod for rotating it, a guide bar within the harness provided with a track at its upper edge, and a support for said head slidingly mounted in said track.

20. In an apparatus of the kind described, a rotary rod provided at its forward end with an operating head to engage the harness cords, mechanism at the rear end of said rod for rotating it, a guide bar carried by the loom harness between the opposite cords thereof provided with a track in its upper edge, and a support for said head slidingly mounted in said track.

21. Apparatus of the kind described, adapted to operate on a plurality of harnesses, comprising means for holding said harnesses normally open, and mechanism for successively threading the cords of any one of the respective harnesses, said mechanism consisting in a unitary device coöperating with each harness and arranged to select its cords successively and hold them in position to be threaded while holding the succeeding cords backward under tension.

22. Apparatus of the kind described, adapted to operate on a plurality of harnesses normally held open, comprising means coöperative with each harness for holding successive selected cords thereof with the eye in position to be threaded, said means being automatically operative to select an eye first at one side of a harness and then at the other, and being formed for this purpose as a unitary operating member.

23. In a mechanism for selecting and separating the heddle eyes of a harness maintained in leased condition, the combination with a selector mounted to work within the lease, of means for giving said selector a swinging movement across the line of heddles, said selector having a radially projecting heel adapted to hold back the unthreaded heddles, and provided also with an oppositely extending radial portion presenting a relatively advanced holding shoulder adapted to be swung into the path of the released heddle when the first projection has moved to release the same, said holding shoulder carrying a smaller intermediate positioning shoulder to assist in facing the heddle eye while the heddle is held by said advanced holding shoulder, said positioning shoulder extending radially in the same direction with said holding shoulder, and said selector having also a wedge shaped formation adapted to advance the released heddle when the first-named projection is swung back of the same; means to give said selector a compound oscillatory movement, first across the line of heddles to release the heddles one by one, next back to an approximate mid position, thereby to advance said heddle to a position against said holding shoulder, next in an opposite direction to cause said positioning shoulder to engage the heddle and assist in positioning the eye thereof for the drawing-in operation, and next in the opposite direction again across the line of heddles to further advance and discharge said previously positioned heddle and simultaneously to release the next adjacent heddle of the series; and means to give a relative traversing movement between said member and the harness, lengthwise the latter.

24. A harness cord selector mounted to operate within the lease of a harness, said selector presenting a head with a wedge shaped front surface 32, said head being extended radially in one direction to provide the heel 38 for holding back unthreaded heddles, but adapted to release successive heddles therefrom, and said head being extended radially in the opposite direction to present the more advanced holding shoulder 39 to stop a released heddle, and said head having also the positioning shoulder 40 to assist in positioning the stopped heddle; and means for moving said selector across the line of heddles to select, position and discharge successive heddles.

25. A harness cord selector mounted to operate within the lease of a harness, said selector presenting a wedge shaped head 32 for advancing the heddles when released, a holding back heel 38 and a more advanced stop shoulder 39; and means for moving said selector across the line of heddles to release, position and discharge successive heddles of the leased harness.

26. A harness cord selector mounted to operate within the lease of a harness, said selector presenting a wedge shaped holding back heel 38 adapted to release and advance the heddles one by one; a positioning stop shoulder 40 to assist in facing a released heddle; and means for moving said selector across the line of heddles to select and position successive heddles.

27. A harness cord selector for acting upon the heddle eyes of a harness maintained in leased condition and adapted to operate within the lease of the harness, said selector having a radial holding formation adapted to hold back the unthreaded heddles, but adapted to be moved to release successive heddles, said selector also presenting a more advanced holding formation adapted to be interposed to stop the advance of the heddle thus released, and also a positioning formation adapted to assist in facing a released or stopped heddle, and presenting also a wedge shaped wall adapted to advance a released heddle, first to its stopped position, and then to a position of discharge; and means for imparting to said heddle selector the necessary movements across the line of heddles to release, position and discharge successively the heddle eyes of the leased harness.

28. A harness cord selector for acting on the heddle eyes of a harness maintained in leased position and adapted to operate within the lease of the harness, said selector having a holding formation adapted to hold back the unthreaded heddles and adapted to be moved to release successive heddles, said selector also presenting a more advanced holding formation adapted to be interposed to stop the advance of the heddle thus released, and also a positioning formation adapted to assist in facing a released or stopped heddle; and means for imparting to said heddle selector the necessary movements across the line of heddles to release and position successively the heddle eyes of the leased harness.

29. A harness cord selector mounted to operate within the lease of a harness, and mechanism for moving the same, said selector including a unitary device presenting a formation adapted to release successive heddles, and a further formation adapted to stop the advance of the released heddle in a position where it may receive a warp thread.

30. In an apparatus of the class described, the combination with means to establish a leased condition of the heddle eye supporting cords of a harness, of a selector operating within the lease and presenting a formation adapted to hold back the unthreaded heddles, but to release the same one by one for the threading operation, said selector having a formation adapted to engage with and advance a released heddle, first to a threading position, and thence from the threading position to a position of discharge toward the previously threaded heddles; and means for moving said selector transversely the line of heddles to cause the selector to feed successive heddles through said successive positions.

31. In an apparatus of the class described, the combination with means to establish a leased condition of the heddle eye supporting cords of a harness, of a selector operating within the lease, with means for moving the same transverse the line of heddles, said selector presenting a formation adapted to hold back the unthreaded heddles, but to release the heddles one by one for the threading operation, said selector also having a formation adapted, when said selector is given its transverse movement, to engage with and advance a threaded heddle in the direction of the previously threaded heddles.

32. In an apparatus of the class described, the combination with means to establish a leased condition of the heddle eye supporting cords of a harness, of a selector operating within the lease, and means for moving the same transverse the line of heddles, said selector presenting a formation adapted to hold back the unthreaded heddles, but to release the same one by one, and having also a formation adapted through the movement of the selector to be interposed to stop the further advance of a heddle when released to permit the same to be threaded, said last formation being adapted to be withdrawn to permit the discharge of the heddle when threaded, and said selector also having a formation adapted, when said selector is given its transverse movement, to engage with and advance a released heddle into its threading position.

33. In an apparatus of the class described, the combination with means to establish a leased condition of the heddle eye supporting cords of a harness, of a selector operating within the lease and means for moving the same transverse the line of heddles, said selector presenting a formation adapted to hold back the unthreaded heddles, but to release the same one by one, and having also a formation adapted through the movement of the selector to be interposed to stop the further advance of the heddle when released to permit the same to be threaded, said formation being adapted to be withdrawn to permit the discharge of the heddle when threaded; and a facing member on said selector to assist in facing the heddle eye when so stopped, said selector also having a formation adapted, when said selector is given its transverse movement, to engage with and advance the released heddle into its threading position.

34. In an apparatus of the class described for selecting for the drawing-in operation the successive heddle eyes of a harness maintained in leased condition, the combination of a unitary device operating within the lease to effect an initial separation of individual heddle cords as they are to be threaded, said device having a part constructed and arranged to hold back the unthreaded heddles; and means for moving said device transverse the line of heddles to release successive heddle cords, said device being wedge-shaped so that on its return movement it is adapted to enter between the released heddle and the main body, and by said return movement enforce a further movement of the released heddle toward a threading position.

35. In an apparatus of the kind described, means to establish a leased condition of the heddle eye supporting cords at a position proximate the harness eyes; and a unitary device operating upon said lease to effect an initial separation of individual cords as they are to be threaded to advance them successively to a threading position by a single continuing engagement with each cord, said device having a part thereof constructed and arranged to engage the threaded harness cords and hold them forward away from the non-threaded cords during the threading operation.

36. In an apparatus for separating elements held in leased condition, a transversely reciprocatory device, and means for moving the same transversely adapted by its movement in one direction to release successive elements, said device on its return movement being adapted to enter between the released element and the main body, and by said return movement enforce a further separating movement of the released element.

37. In an apparatus for separating elements held in leased condition and adapted to be selected by release one by one from the main body of elements, means working within the lease and having a transversely reciprocatory separating movement whereby it is interposed between the selected element and the main body, said means by the same movement being adapted to convey still further the freed element from the body of leased elements.

38. In an apparatus for separating elements held in leased condition and adapted to be selected by release one by one from the main body of elements, the combination with means for holding the elements in leased arrangement of a separating device arranged to bear continuously against the elements near the point where the latter cross one another, and means for reciprocatively moving said separating device from one side to the other of the point where said elements cross, said member being shaped to release the elements one by one and by a continuing engagement therewith to advance the released element.

39. In an apparatus of the class described, the combination with means to establish a leased condition in a body of loom elements, of a selector operating within the lease and presenting a formation adapted to hold back the main body of elements but to release them one by one, said selector having a formation adapted to engage and advance a released element by a single continuing engagement therewith, first to a predetermined position, and thence from said position to a position of discharge toward a previously released element, and means for moving said selector transversely the line of elements to cause the same to advance successive elements through said successive positions.

40. A selector for loom elements arranged in leased condition, said selector presenting a head with a wedge shaped front surface 32, said head being extended radially in one direction to provide the heel 38 for holding back the main body of elements, but adapted to release successive elements therefrom, said head being extended radially in the opposite direction to present the more advanced holding shoulder 39 to stop a released element, and said head having also an intermediate shoulder 40, and means for moving said selector to select, position and discharge successive elements.

41. A selector for loom elements arranged in leased condition and mounted to operate within the lease, said selector presenting a wedge shaped head 38 for advancing the released elements, a holding back heel 38, and a more advanced stop shoulder 39, and means for actuating said selector.

42. A selector for acting upon loom elements maintained in leased condition and adapted to operate within the lease, said selector having a radial holding formation adapted to hold back the main body of elements but adapted to be moved to release successive elements, said selector also presenting a more advanced holding formation adapted to be interposed to stop the advance of an element thus released and presenting also a wedge shaped wall adapted to advance a released element first to its stop position and then to a position of discharge, and means for imparting to said selector the necessary movement across the line of elements to released position and discharge successive elements.

43. In an apparatus of the class described, the combination of means to establish a leased condition in loom elements, of a selector operating within the lease, and means for moving the same transverse the line of elements, said selector presenting a formation adapted to hold back the elements but to release the same one by one and having also a formation adapted through the movement of the selector to be interposed to stop the further advance of an element when released to permit the same to be positioned, said last formation being adapted to be withdrawn to permit the discharge of said element, and said selector also having a formation adapted when said selector is given its transverse movement to engage with and advance a released heddle.

44. In an apparatus for separating the heddles of a harness held in leased condition, a reciprocatory device, means for moving the same, said device adapted by its movement in one direction to release successive heddles, and said device on its return movement being adapted to enter between the released heddle and the main body, and by said return movement enforce a further separating movement of the released heddle, and means for placing an increased tension on heddle cords while engaged by said reciprocatory device.

45. In an apparatus of the kind described, means adapted to maintain the heddles of a harness in leased condition, and a selector operating within the lease to effect an initial separation of individual heddles as they are to be threaded and move them successively to a threading position by a single continuing engagement with each heddle, said device presenting a formation adapted to hold back the unthreaded heddles but to release the same one by one and advance and position a released heddle, and means for placing an increased tension on heddles engaged by said device.

46. In an apparatus of the kind described, means adapted to maintain the heddles of a harness in leased condition, and a selector operating within the lease to effect an initial separation of individual heddles as they are to be threaded and move them successively to a threading position by a single continuing engagement with each heddle, said device presenting a formation adapted to hold back the unthreaded heddles but to release the same one by one and advance and position a released heddle, and means for placing an increased tension on heddles engaged by said device, said means comprising a movable member arranged within the lease and on the opposite side of the line of heddle crossings from said selector and adapted to be moved to intermittently engage the adjacent heddle cords to tension the same.

47. In an apparatus of the class described, the combination with the heddle selector 32 arranged within the lease and acting to release, advance and position successive members of the leased elements, and a tensioning device comprising the movable member 80 arranged to engage and tension the adjacent leased elements.

48. In an apparatus for separating elements held in leased condition and adapted to be selected one by one from the main body of elements, separating means, means for positioning the separating means in operative relation to the element to be selected, and means acting when the separating means has been positioned to impart a separating movement thereto whereby to interpose it between the selected element and the main body of elements and, by the same movement, effect further separation of said element from the main body of elements.

In testimony whereof I have signed my name to this specification.

CHESTER E. FIELD.